Dec. 22, 1931.  I. SIKORSKY  1,838,044
AIRCRAFT ESPECIALLY AIRCRAFT OF THE AMPHIBIAN TYPE INCLUDING
MEANS OF CONSTRUCTING AND OPERATING THE SAME
Original Filed Feb. 12, 1929   4 Sheets-Sheet 3
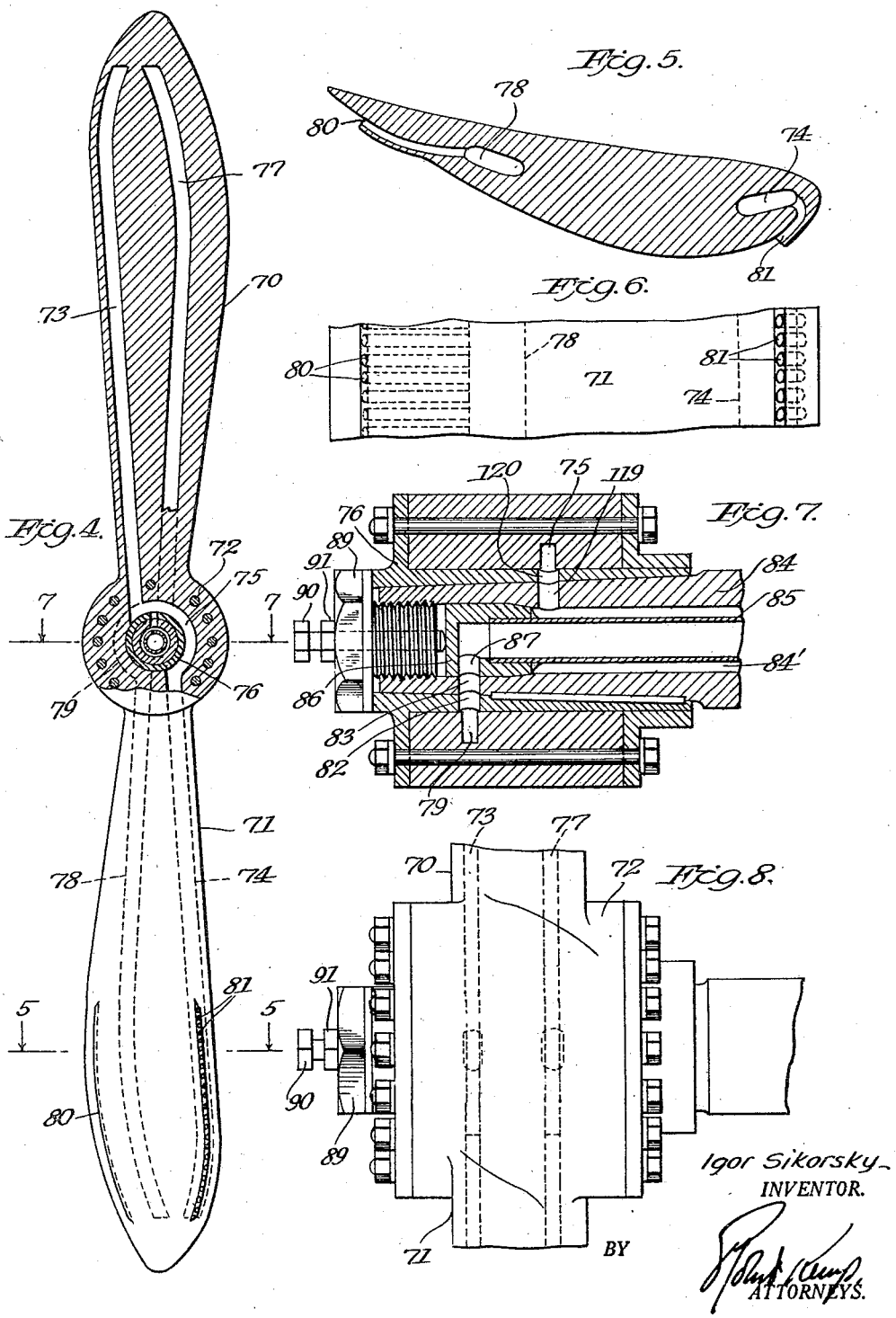
Igor Sikorsky
INVENTOR.
BY
ATTORNEYS.

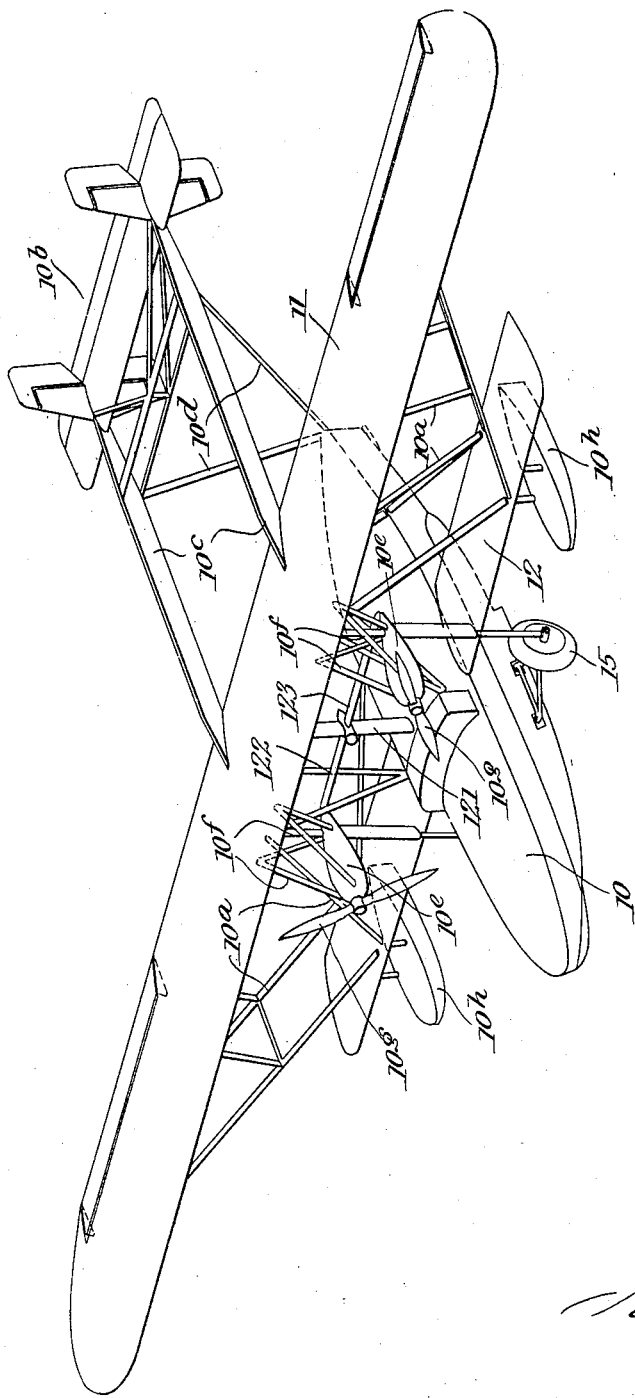

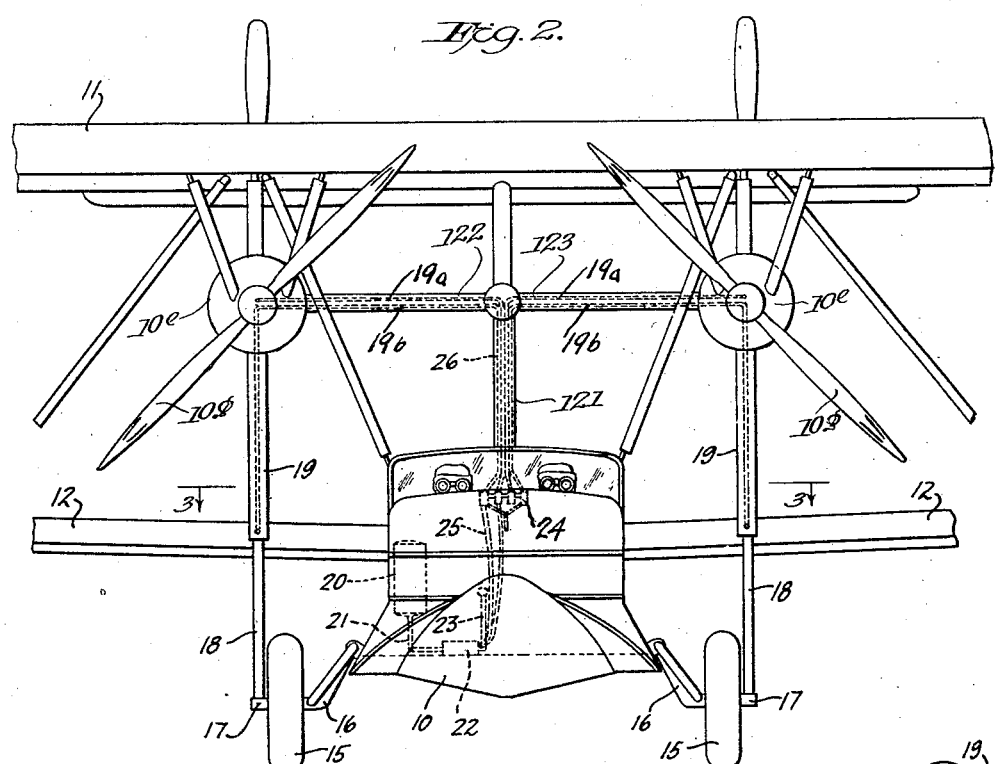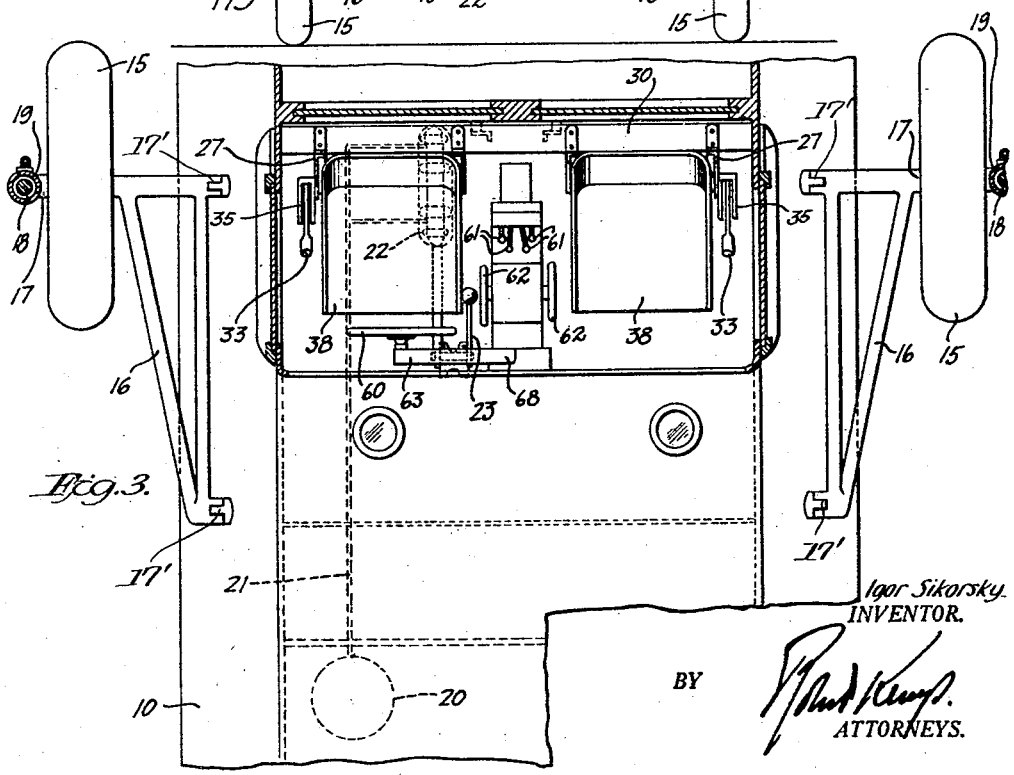

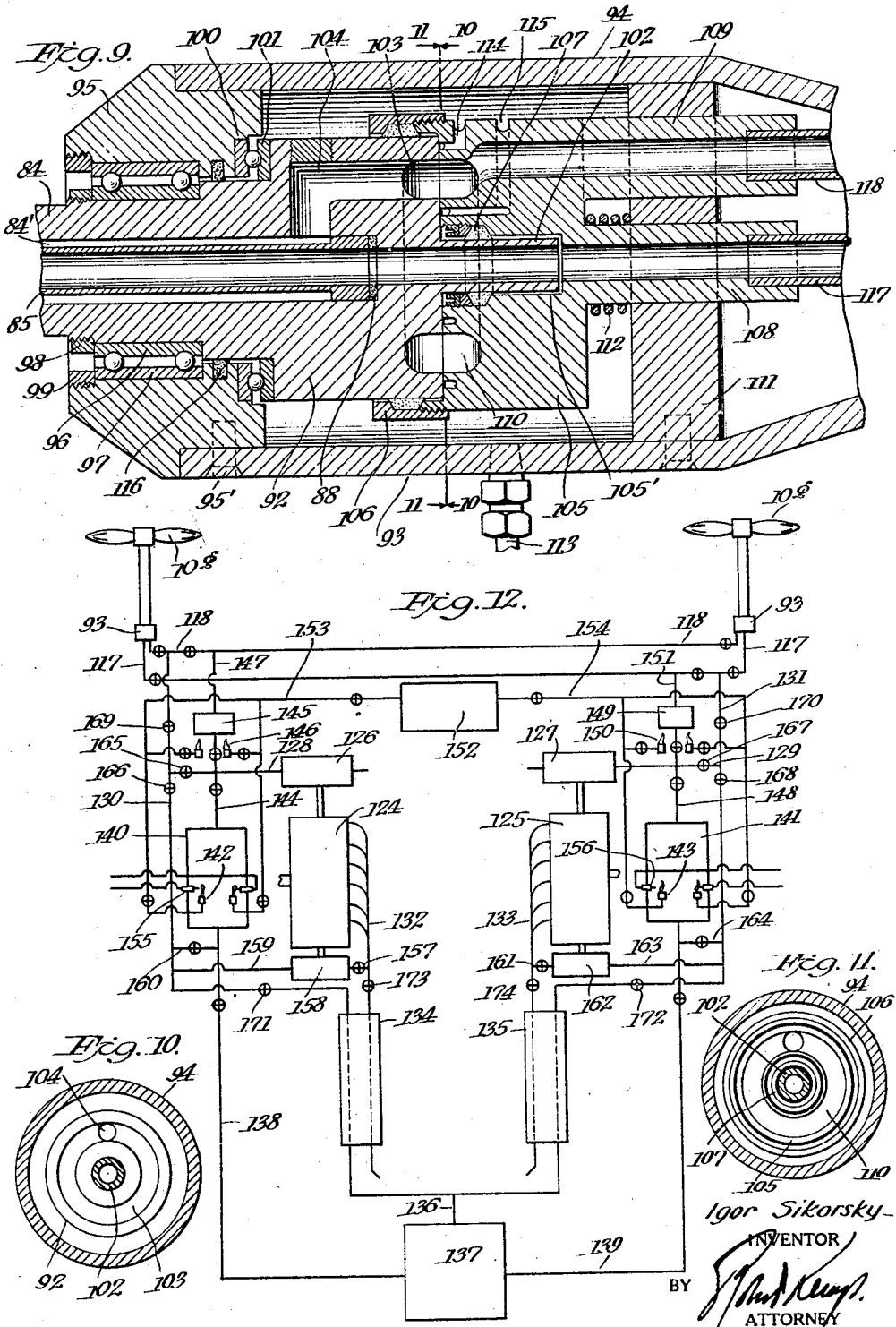

Patented Dec. 22, 1931

1,838,044

UNITED STATES PATENT OFFICE

IGOR SIKORSKY, OF COLLEGE POINT, LONG ISLAND, NEW YORK, ASSIGNOR TO SIKORSKY AVIATION CORPORATION, OF WILMINGTON, DELAWARE, A CORPORATION OF DELAWARE

AIRCRAFT, ESPECIALLY AIRCRAFT OF THE AMPHIBIAN TYPE, INCLUDING MEANS OF CONSTRUCTING AND OPERATING THE SAME

Application filed February 12, 1929, Serial No. 339,430. Renewed May 12, 1931.

The present invention relates to improvements in operating means for aircraft of all kinds, although since it has particular reference to propulsion means for multi-motor amphibions, I have described it with particular reference to that type of machine.

The propulsion means and method to be described and claimed herein, have application generally to aircraft members of aerofoil cross section. According to the invention, such members are provided with reaction jets preferably disposed adjacent their trailing or following edges and with other jets disposed adjacent their leading edges and discharging over their surfaces at their negative side. By the expression "negative side", I mean that side of a member of aerofoil section at which a negative pressure normally assists in operation. As applied to a propeller, the described jets respectively act as driving means, and as means for increasing the vacuum normally existing over the negative side of the propeller.

The inherent structural characteristics of multi-motor amphibions are such as to give rise to large parasitic drag. Consequently, the present invention has particular reference to this type of machine, since by the substitution of small transfer boxes for fluid under pressure in place of the usual engine nacelles, the resistance is greatly reduced with proportionate benefit to the flying characteristics of the machine.

The pressure medium used may be air or air mixed with other gases, such as the exhaust gases from the internal combustion engines which drive the air pumps. However, I do not limit myself with respect to the nature of the fluid medium which may be any such as may be convenient and practicable.

According to one preferred phase of the invention, the air which is to be supplied to reaction propellers, is first of all mechanically placed under pressure by means of a positive action air pump or blower and during its subsequent passage to the propellers is expanded by the application of heat thereto with consequent increase in work capacity. The heating of the air may be accomplished in a number of different ways which will be hereinafter described.

In addition to the mechanical advantages obtained by thus expanding the air, the discharged air serves the purpose of preventing, to a large extent, the formation of ice on the aircraft members. The invention will be described in detail with reference to the accompanying drawings in which:

Fig. 1 is an isometric perspective of an amphibion equipped with my improved propulsion means.

Fig. 2 is a front elevation of the central portion of the machine.

Fig. 3 is a section on the line 3—3 of Fig. 2.

Fig. 4 is an elevation of a propeller back, partly in section showing the jet arrangement.

Fig. 5 is a section on the line 5—5 of Fig. 4.

Fig. 6 is an enlarged elevation of a portion of the propeller shown in Fig. 4.

Fig. 7 is a section on the line 7—7 of Fig. 4.

Fig. 8 is a side elevation of the propeller boss.

Fig. 9 is a longitudinal section through a transfer box for the fluid pressure medium.

Fig. 10 is a partial section along the line 10—10 of Fig. 9.

Fig. 11 is a partial section along the line 11—11 of Fig. 9, and

Fig. 12 is a diagram showing a preferred arrangement of units composing the propulsion system.

Referring first to Fig. 1, 10 indicates the body-boat of an amphibion, 11 and 12 upper and lower wings respectively and 10a the interconnecting struts. The empennage 10b is supported at the ends of outriggers 10c which extend rearwardly from the main plane 11, the rear ends of the outriggers being connected to the rear end of the body-boat 10 by means of struts 10d. The reference numerals 10e designate streamline housings for transfer boxes for the pressure medium which will be more particularly described hereinafter. The boxes and their housings are rigidly supported from the main frame by means of struts 10f. The propellers are indicated at 10g, while 10h designates the wing pontoons.

Landing wheels 15, Figs. 1 and 2, may be moved from the operative position shown, to an inoperative position in which they lie in horizontal planes immediately below wing 12.

Referring particularly to Figs. 2 and 3, it will be seen that the wheel axles 17 are supported on brackets 16 pivotally connected to the body 10 at points 17' for movement about normally substantially horizontal axes. The outer ends of axles 17 are pivotally connected to rods 18 guided in tubular members 19 which are in turn pivoted at their upper ends to the frame structure. Rods 18 are provided interiorly of tubular members 19 with piston heads which are adapted to be suitably influenced to move the wheels from operative to inoperative position. According to the illustrated arrangement, hydraulic pressure is employed for this motive function, the particular fluid medium preferably being oil, glycerine or the like. A supply of the pressure medium is contained in tank 20 and a conduit 21 leads from the tank to a pressure generating device 22 which is controlled by means of a lever 23. The lines to and from pressure generator 22 are indicated at 25 and lead to a distributor 24 disposed within convenient reach of the pilot in the pilot's compartment 30. Distributor 24 is connected to tubular members 19 by means of pipes 19a and 19b, the former debouching into the tubular members above the upper limit of travel of the piston heads associated with rods 18, and the latter debouching into said members below the lower limits of travel of the piston heads. Distributor 24 is suitably provided with valves so that fluid may be supplied at will to one or both of conduits 19a or to one or both of conduits 19b so that the wheels 15 may be correspondingly raised or lowered.

The fluid medium, in addition to acting as an operating agent, has the function of serving as cushioning means when the machine is landed on its wheels.

It will be noted that the pilot's compartment 30 is provided with two chairs 38 placed side by side. Since the arrangement of this compartment and the control devices therein have been particularly described and claimed in my above named applications, it will suffice here to state that the reference numerals 61 indicate the engine control levers, 33 indicates levers cooperating with segments 35 to adjust the seats to various heights and retain them in adjusted position, 62 indicates the stabilizer controls and 68 indicates the aileron control member which has a pivoted extension so supported that it may be swung to bring wheel 60 in front of either chair 38.

In Fig. 4, a propeller is shown comprising blades 70 and 71 and boss 72. The leading edge of each blade is provided with a longitudinal passage 73 and 74 respectively, these being joined by an arcuate recess 75 surrounding the propeller hub 76. Each blade has also a longitudinally extending passage 77 and 78 respectively adjacent its following edge, these passages being connected by an arcuate recess 79 similar to 75. For a distance adjacent the blade tips, discharge orifices 80 and 81 are formed, these communicating with passages 78 and 74 respectively. As particularly shown in Fig. 5, the propeller back is stepped downwardly toward its following edge, there being two steps determining respectively the position of orifices 81 and 80.

Referring to Fig. 7, hub 76 is provided with an aperture 82 communicating with recess 75. Aperture 82 likewise registers with an aperture 83 formed in the wall of a hollow shaft 84 (see also Fig. 9) to the end of which the propeller hub is keyed. A tube 85, Figs. 7 and 9, is supported concentrically of the bore 84' of shaft 84 and is closed at its front end, Fig. 7, by means of a cap 86 having an aperture 87 in register with aperture 83. The rear end of tube 85, Fig. 9, is provided with a circumferential flange for the purpose of maintaining the tube in concentric relation to bore 84', the rear end of tube 85 seating against a washer 88. The propeller hub is secured to the end of shaft 84 by means of a cap screw 89 cooperating with threads formed in the end of bore 84'. Cap screw 89 is provided with a threaded axial bore in which engages a cap screw 90 which abuts with its inner end cap 86 to hold the latter and tube 85 in proper position. A nut 91 serves to lock cap screw 90 in adjusted position.

The end of shaft 84, remote from the propeller, is provided with an expanded head 92 extending within transfer box 93. Transfer box 93 comprises a hollow cylindrical member 94 supporting at its end adjacent the propeller, a ring 95, which latter and shaft 84 are appropriately shouldered to receive the members 96 and 97 of a ball bearing assembly which are respectively held in position by means of threaded rings 98 and 99, and constitute a journal bearing for the propeller shaft.

The adjacent vertical faces of ring 95 and head 92 support members 100 and 101 of a ball bearing assembly which constitutes the thrust bearing. Ring 95 is rigidly secured to casing 94 by means of screws such as shown at 95'.

The rear face of head 92 is provided with a central horizontal extension 102 and an annular concentric recess 103 which by means of an angular passage 104 communicates with bore 84' forward of the flanged head of tube 85. A fitting 105 has a face adapted to contact with the rear face of head 92, this face being provided with a circumferential flange circumscribing the rear margins of head 92 and cooperating with ring 106 to form a packing gland. Member 105 is provided with a bore 105' in which extension 102 projects and a packing gland 107 is provided to effect a tight fit between the two. Member 105 is provided with a rearward tubular extension 108 concentric with bore 105'. Member 105 is also provided with an eccentric rearward extension 109 provided with a bore which communicates with an annular recess 110 registering with annular recess 103. Extensions 108 and 109 pass through closely fitting apertures in a wall 111 secured within casing 94, the latter tapering off rearward of this wall. Rotation of fitting 105 about extension 108 is prevented by the eccentric extension 109, although axial movement of the fitting relative to wall 111 is permitted. A spring 112 yieldingly urges fitting 105 against head 92.

In practice the interior of the casing will be filled with oil supplied through tube 113, the contacting faces of members 92 and 105 receiving lubricant through ducts 114 and 115. The escape of the oil from the forward end of the casing is prevented by a gasket 116.

The fluid medium under pressure is supplied to the hollow stem 108 through a preferably flexible tube 117 in connection with the air pump which is preferably disposed in the body-boat. The air thus supplied passes through head 92, tube 85, apertures 87, 83 and 82, recess 75 and passages 73 and 74 to discharge orifices 81. Air conducted to tubular extension 109 through pipe 118 flows into the registering annular recesses 110 and 103, passage 104, bore 84', an aperture 119 in shaft 84, an aperture 120 in hub 76, recess 79, and passages 77 and 78 to discharge orifices 80.

The transfer boxes 93, as has been mentioned above, are disposed in streamline housings 10e and rigidly secured in position through struts 10f. The communicating tubes 117, 118 are preferably led to the transfer boxes through the streamline conduits 121, 122 and 123, which likewise house tubes 19a and 19b.

In Fig. 12, reference characters 124 and 125 denote internal combustion engines adapted to drive positive pressure air pumps or blowers 126 and 127. These latter are connected by means of lines 128 and 129 with lines 130 and 131 respectively, which latter respectively communicate with pipes 118 and 117. Reference characters 132 and 133 denote the exhaust lines of the internal combustion engines which pass through heat exchangers 134 and 135. Lines 130 and 131 are passed through these heat exchangers and are confluent with a pipe 136 which leads to a reservoir or expansion chamber 137. Lines 138 and 139 lead from chamber 137 through chambers 140 and 141 where the air may be passed into direct contact with flames 142 and 143. Line 144 connects chamber 140 with a chamber 145 heated by externally disposed flames 146. Line 147 connects chamber 145 with pipe 118. Chamber 141 is connected by means of a line 148 with a chamber 149 externally heated by means of flames 150, and chamber 149 is connected with pipe 117 through line 151. A fuel supply tank 152 is connected by means of lines 153 and 154 with burners 146, 142, and 150, 143 respectively. Electrical sparking devices 155 and 156 are provided for lighting the housed burners 142 and 143.

The exhaust from engine 124 may be diverted through a valve controlled by-pass 157 through an engine driven blower 158 and thence through line 159 into line 130. A by-pass 160 is provided between lines 138 and 139. The exhaust from engine 125 may be delivered through a valved by-pass 161 to a blower 162 and thence through line 163 to line 131. A valved by-pass 164 is provided between lines 139 and 131.

By opening valve 165 and closing valve 166 and leaving open the valves shown in line 118, cold air may be supplied from fan 126 directly to line 118 and thence to both propellers. By opening valve 167, closing valve 168 and opening the valves associated with line 117, cold air may be supplied direct from blower 127 to line 117 and thence to both propellers.

By closing valves 169 and 170, the air from each of blowers 126 and 127 may be diverted through heat exchangers 134 and 135 to chamber 137 and thence through chambers 140 and 145 to line 118 and through chambers 141 and 149 to line 117, the air being heated as desired through manipulation of burners 142, 146 and 143 and 150. The air is initially heated in the heat exchangers and then additionally heated as desired in chambers 140, 145 and 141 and 149.

If desired, valves 166, 169 and 168, 170 may be opened and valves 171 and 172 closed. Thereupon, valves 173 and 174 may be closed and valved by-passes 157 and 161 opened so that the hot engine exhaust will be delivered by blowers 158 and 162 into lines 159, 130 and 118, and lines 163, 131 and 117.

If, for example, engine 125 is out of commission, by proper manipulation of the valves, air may be delivered from blower 126 into both lines 117 and 118, as will be evident.

Thus, by the described arrangement, one motor may deliver to one series of orifices of both propellers, or to both series of both propellers. Also, both motors may deliver to one series of apertures of both propellers or to both series, and either hot or cold air may be supplied. The illustrated arrangement of valves further enables the propellers to be throttled independently of each other so that the desired performance may be secured.

While I have described my invention in some detail, it will be understood that I do not intend to limit myself except as determined in the following claims.

I claim:

1. The combination with a propeller having a reaction jet and a vacuum-increasing jet, of a separate supply passage for each jet leading from the interior of the propeller boss, a tubular axial supporting member for said propeller in connection with one of said passages, and a second tubular member within the first and in connection with the other of said passages.

2. The combination with a propeller having a reaction jet and a vacuum-increasing jet, of a separate supply passage for each jet leading from the interior of the propeller boss, a tubular axial supporting member for said propeller in connection with one of said passages, and a second tubular member concentrically arranged within the first and in connection with the other of said passages.

3. The combination with a propeller having a reaction jet and a vacuum-increasing jet, of a separate supply passage for each jet leading from the interior of the propeller boss, a tubular axial supporting member for said propeller in connection with one of said passages, a second tubular member within the first and in connection with the other of said passages, and a transfer box for fluid under pressure rotatably supporting said supporting member.

4. The combination with a propeller having a reaction jet and a vacuum-increasing jet, of a separate supply passage for each jet leading from the interior of the propeller boss, a tubular axial supporting member for said propeller in connection with one of said passages, a second tubular member within the first and in connection with the other of said passages, a head on the rear end of said supporting member, and a transfer box for fluid under pressure within which said head projects, said box provided with journal bearing and thrust bearing surfaces for cooperation with said supporting member and head respectively.

5. The combination with a propeller having a passage therein, and a hollow rotatable supporting shaft for the propeller communicating with said passage, of a transfer box for fluid under pressure and into which the rear end of said shaft extends, a non-rotatable member in said box slidable in the axial direction of said shaft and having a passage in alignment with said shaft, means for preventing axial movement of the shaft relative to the box, and means for yieldably urging said member against the inner end of said shaft.

6. The combination with a propeller having a passage therein, and a hollow rotatable supporting shaft for the propeller communicating with said passage, of a transfer box for fluid under pressure and into which the rear end of said shaft extends, a non-rotatable member in said box slidable in the axial direction of said shaft and having a passage in alignment with said shaft, means for preventing axial movement of the shaft relative to the box, and means for yieldably urging said member against the inner end of said shaft, said shaft having an expanded end face contacting with a similar face of said member.

7. The combination with a propeller having a passage therein, and a hollow rotatable supporting shaft for the propeller communicating with said passage, of a transfer box for fluid under pressure and into which the rear end of said shaft extends, a non-rotatable member in said box slidable in the axial direction of said shaft and having a passage in alignment with said shaft, means for preventing axial movement of the shaft relative to the box, and means for yieldably urging said member against the inner end of said shaft, said shaft having an expanded end face contacting with a similar face on said member, said faces having registering annular recesses as and for the purpose described.

8. The combination with a propeller having a passage therein, and a hollow rotatable supporting shaft for the propeller communicating with said passage, of a transfer box for fluid under pressure and into which the rear end of said shaft extends, a non-rotatable member in said box slidable in the axial direction of said shaft and having a passage in alignment with said shaft, means for preventing axial movement of the shaft relative to the box, and means for yieldably urging said member against the inner end of said shaft, said shaft having an expanded end face contacting with a similar face on said member and a reduced extremity extending within said member.

9. The combination with a propeller having a passage therein, and a hollow rotatable supporting shaft for the propeller communicating with said passage, of a transfer box for fluid under pressure and into which the rear end of said shaft extends, a non-rotatable member in said box slidable in the axial direction of said shaft and having a passage in alignment with said shaft, means for preventing axial movement of the shaft relative to the box, means for yieldably urging said member against the inner end of said shaft, said shaft having an expanded end face contacting with a similar face on said member and a reduced extremity extending within said member, and packing means between said extremity and said member.

10. In an aircraft, a reaction driven propeller, a hollow rotatable supporting shaft for said propeller, a stationary transfer box for a fluid medium under pressure supporting said shaft, said box being removed from the main body of the aircraft.

11. In an aircraft, a plurality of reaction driven propellers, a hollow rotatable supporting shaft for each propeller, a stationary transfer box for a fluid medium under pressure supporting each of said shafts, said boxes being removed from the main body of the air craft in symmetrical relation thereto.

12. In an amphibion, a reaction driven propeller, a hollow rotatable supporting shaft for said propeller, a stationary transfer box for a fluid medium under pressure supporting said shaft, said box being removed from the main body of the amphibion, and a stream line housing for said box.

13. In an amphibion, a plurality of reaction driven propellers, a hollow rotatable supporting shaft for each propeller, a stationary transfer box for a fluid medium under pressure supporting each of said shafts, said boxes being removed from the main body of the amphibion in symmetrical relation thereto, and a streamline housing for each of said boxes.

14. In a propulsion system for an aircraft and the like, a plurality of propellers each having a blade provided with a plurality of longitudinally extending passages terminating respectively in orifices adjacent the leading edge and adjacent the following edge of the blade, a separate conduit in connection with each passage of the blade of each propeller, a plurality of motors, a positive pressure air pump driven by each of said motors, and means adapted to connect a single pump with a single conduit or all the pumps with the same conduit.

Signed at College Point, Long Island, in the county of Queens and State of New York, this 21st day of December A. D. 1928.

IGOR SIKORSKY.